United States Patent
Ren et al.

(10) Patent No.: US 9,843,930 B2
(45) Date of Patent: Dec. 12, 2017

(54) TRUSTED EXECUTION ENVIRONMENT INITIALIZATION METHOD AND MOBILE TERMINAL

(71) Applicant: China Mobile Communications Corporation, Beijing (CN)

(72) Inventors: Xiaoming Ren, Beijing (CN); Gengsheng Huang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/107,956

(22) PCT Filed: Dec. 25, 2014

(86) PCT No.: PCT/CN2014/094889
§ 371 (c)(1),
(2) Date: Jun. 24, 2016

(87) PCT Pub. No.: WO2015/096757
PCT Pub. Date: Jul. 2, 2015

(65) Prior Publication Data
US 2016/0330618 A1  Nov. 10, 2016

(30) Foreign Application Priority Data
Dec. 25, 2013 (CN) .......................... 2013 1 0727062

(51) Int. Cl.
*H04L 9/32* (2006.01)
*H04W 12/04* (2009.01)
(Continued)

(52) U.S. Cl.
CPC .......... *H04W 12/04* (2013.01); *H04B 1/3816* (2013.01); *H04W 4/003* (2013.01); *H04W 12/06* (2013.01); *H04L 63/0823* (2013.01)

(58) Field of Classification Search
CPC ..... H04W 12/04; H04W 4/003; H04W 12/06; H04W 8/18; H04B 1/3816;
(Continued)

(56) References Cited

U.S. PATENT DOCUMENTS

2008/0009265 A1* 1/2008 Fernandez-Alonso .... H04W 12/06
455/411
2008/0209206 A1 8/2008 Vaha-Sipila et al.
(Continued)

FOREIGN PATENT DOCUMENTS

CN 1812611 A 8/2006
CN 101409592 A 4/2009
(Continued)

OTHER PUBLICATIONS

International Search Report for International application No. PCT/CN2014/094889 dated Mar. 25, 2015.
(Continued)

*Primary Examiner* — Techane Gergiso

(57) ABSTRACT

The present disclosure provides a TEE initialization method. An operator identifier acquired from an SIM card is compared with operator identifiers in a list or a table of correspondence between the operator identifiers and public keys preset in a TEE of a mobile terminal, so as to acquire a public key and authenticate a TSM platform with the public key. After the TSM platform has been authenticated successfully, loading processing on the TEE is completed, and a management key of the TEE is downloaded from the TSM platform. According to the present disclosure, it is able to initialize the TEE of the mobile terminal without designating an operator, thereby to improve the openness of the mobile terminal as well as the user experience.

10 Claims, 6 Drawing Sheets

Fig.6

(51) Int. Cl.
*H04W 4/00* (2009.01)
*H04B 1/3816* (2015.01)
*H04W 12/06* (2009.01)
*H04L 29/06* (2006.01)

(58) Field of Classification Search
CPC . H04L 63/0823; H04L 63/0853; H04L 63/08;
H04L 9/0838; H04L 63/0876; H04L
63/101; H04L 9/0819
See application file for complete search history.

(56) References Cited

U.S. PATENT DOCUMENTS

| | | | | |
|---|---|---|---|---|
| 2011/0103586 A1* | 5/2011 | Nobre | | H04L 63/0853 380/270 |
| 2013/0078949 A1* | 3/2013 | Pecen | | H04L 63/101 455/411 |
| 2013/0109352 A1 | 5/2013 | Obaidi | | |
| 2015/0126153 A1 | 5/2015 | Spitz et al. | | |
| 2016/0080944 A1* | 3/2016 | Colegate | | H04W 12/08 455/410 |

FOREIGN PATENT DOCUMENTS

| | | |
|---|---|---|
| CN | 103370899 A | 10/2013 |
| DE | 102012011728 A1 | 12/2013 |

OTHER PUBLICATIONS

L. Zhu et al: "RFC 4556—Public Key Cryptography for Initial Authentication in Kerberos (PKINIT)," URL: https://tools.ieff.org/html/rfc4556#section-3.2, Jun. 30, 2006, pp. 1-84, XP055373727.
Extended European Search Report issued in corresponding EP Application No. 14873156, dated May 26, 2017, 9 pages.

* cited by examiner

US 9,843,930 B2

TRUSTED EXECUTION ENVIRONMENT INITIALIZATION METHOD AND MOBILE TERMINAL

CROSS-REFERENCE TO RELATED APPLICATION

This application is the U.S. national phase of PCT Application No. PCT/CN2014/094889 filed on Dec. 25, 2014, which claims a priority of the Chinese Patent Application No. 201310727062.8 filed on Dec. 25, 2013, the disclosures of both of which are incorporated in their entirety by reference herein.

TECHNICAL FIELD

The present disclosure relates to the field of communication technology, in particular to a Trusted Execution Environment (TEE) initiation method and a mobile terminal.

BACKGROUND

TEE refers to an independent secure operation environment for a mobile phone, which is logically insulated from a normal Rich Execution Environment (REE) and can merely interact with the REE via an authorized Application Programming Interface (API). The TEE may support such security characteristics as secure starting and secure application management, and these characteristics require the pre-distribution of a relevant key in the secure terminal, or the dynamical writing of the relevant key, as shown in FIG. 1.

For a conventional TEE key management scheme, the keys are stored in the TEE. As shown in FIG. 2, an initial key or a normal key is written during the production, and this key is managed by an operator. In this regard, for an open market, it is impossible to acquire the user's selection of the operator, so it is impossible to bind the mobile terminal to a particular operator in advance, i.e., the conventional TEE solution cannot be used for the mobile terminal in the open market. In addition, in the case of changing an operator to which the TEE of the mobile terminal has been bound, the mobile terminal cannot be used any longer, so the user experience will be adversely affected.

Hence, there is an urgent need to make the TEE of the mobile terminal available without binding it to a particular operator in advance.

SUMMARY

An object of the present disclosure is to provide a TEE initialization method and a mobile terminal, so as to make a TEE of a mobile terminal available without binding it to a particular operator.

In one aspect, the present disclosure provides in some embodiments a TEE initialization method for a system including a Trusted Service Management (TSM) platform and a mobile terminal provided with a TEE in which a list of operator identifiers or a table of correspondence between the operator identifiers and public keys is preset, including steps of: acquiring, by the mobile terminal, from a Subscriber Identity Module (SIM) card installed in the mobile terminal an operator identifier preset in the SIM card; inquiring, by the mobile terminal, the table of correspondence or the list to determine whether or not there is an operator identifier identical to the operator identifier acquired from the SIM card; in the case that there is the operator identifier identical to the operator identifier acquired from the SIM card, acquiring, by the mobile terminal, a public key corresponding to the operator identifier in accordance with the table of correspondence or the SIM card, binding the public key to an operator corresponding to the operator identifier, and activating the public key; authenticating, by the mobile terminal, the TSM platform with the public key; and in the case that the TSM platform has been authenticated successfully, completing, by the mobile terminal, loading processing on the TEE and downloading a management key of the TEE from the TSM platform, so as to execute the application management and/or secure operation through the TEE.

In another aspect, the present disclosure provides in some embodiments a mobile terminal for a system including the mobile terminal and a TSM platform, and the mobile terminal is provided with a TEE in which a list of operator identifiers or a table of correspondence between the operator identifiers and public keys is preset. The mobile terminal includes: an acquisition module configured to acquire from an SIM card installed in the mobile terminal an operator identifier preset in the SIM card; an inquisition module configured to inquire the table of correspondence or the list to determine whether or not there is an operator identifier identical to the operator identifier acquired from the SIM card; an activation module configured to, in the case that there is the operator identifier identical to the operator identifier acquired from the SIM card, acquire a public key corresponding to the operator identifier in accordance with the table of correspondence or the SIM card, bind the public key to an operator corresponding to the operator identifier, and activate the public key; an authentication module configured to authenticate the TSM platform with the public key; and a processing module configured to, in the case that the TSM platform has been authenticated successfully, complete loading processing on the TEE and download a management key of the TEE from the TSM platform, so as to execute the application management and/or secure operation through the TEE.

According to the embodiments of the present disclosure, the operator identifier acquired from the SIM card is compared with the operator identifiers in the list or the table of correspondence between the operator identifiers and the public keys preset in the TEE of the mobile terminal, so as to acquire the public key and authenticate the TSM platform with the public key. After the TSM platform has been authenticated successfully, the loading processing on the TEE is completed, and the management key of the TEE is downloaded from the TSM platform. As a result, it is able to initialize the TEE of the mobile terminal without designating the operator, thereby to improve the openness of the mobile terminal as well as the user experience.

DETAILED DESCRIPTION OF THE EMBODIMENTS

In the related art, a TEE of a mobile terminal is enabled after the designation of an operator. In order to resolve this problem, the present disclosure provides in some embodiments a TEE initialization method mainly for a system including a TSM platform and a mobile terminal provided with the TEE in which, different from the related art where a particular operator needs to be designated, a list of operator identifiers or a table of correspondence between the operator identifiers and public keys is preset.

Figure 1:
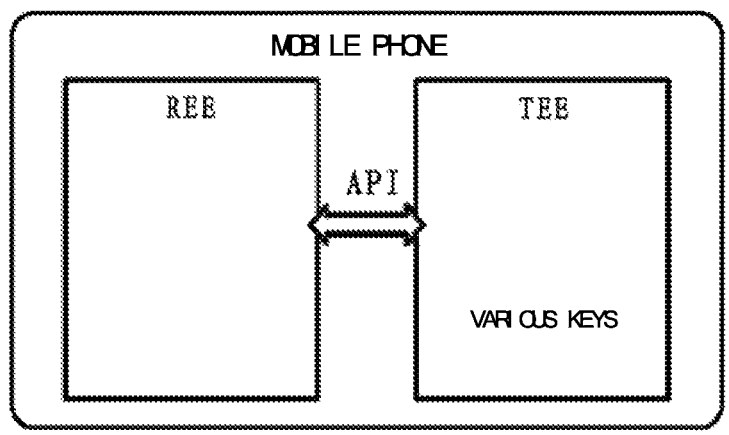
FIG. 1 is a schematic view showing a conventional mobile terminal for running a TEE.
Figure 2:
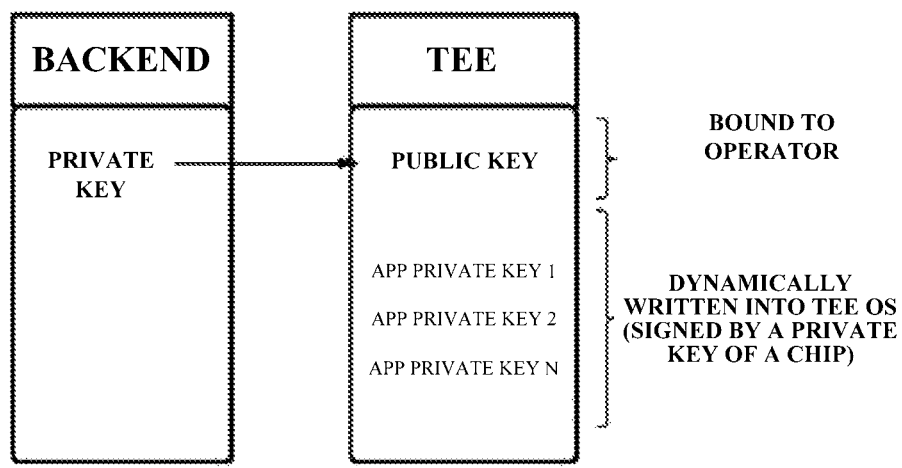
FIG. 2 is a schematic view showing the management of keys in the TEE in the related art.
Figure 3:
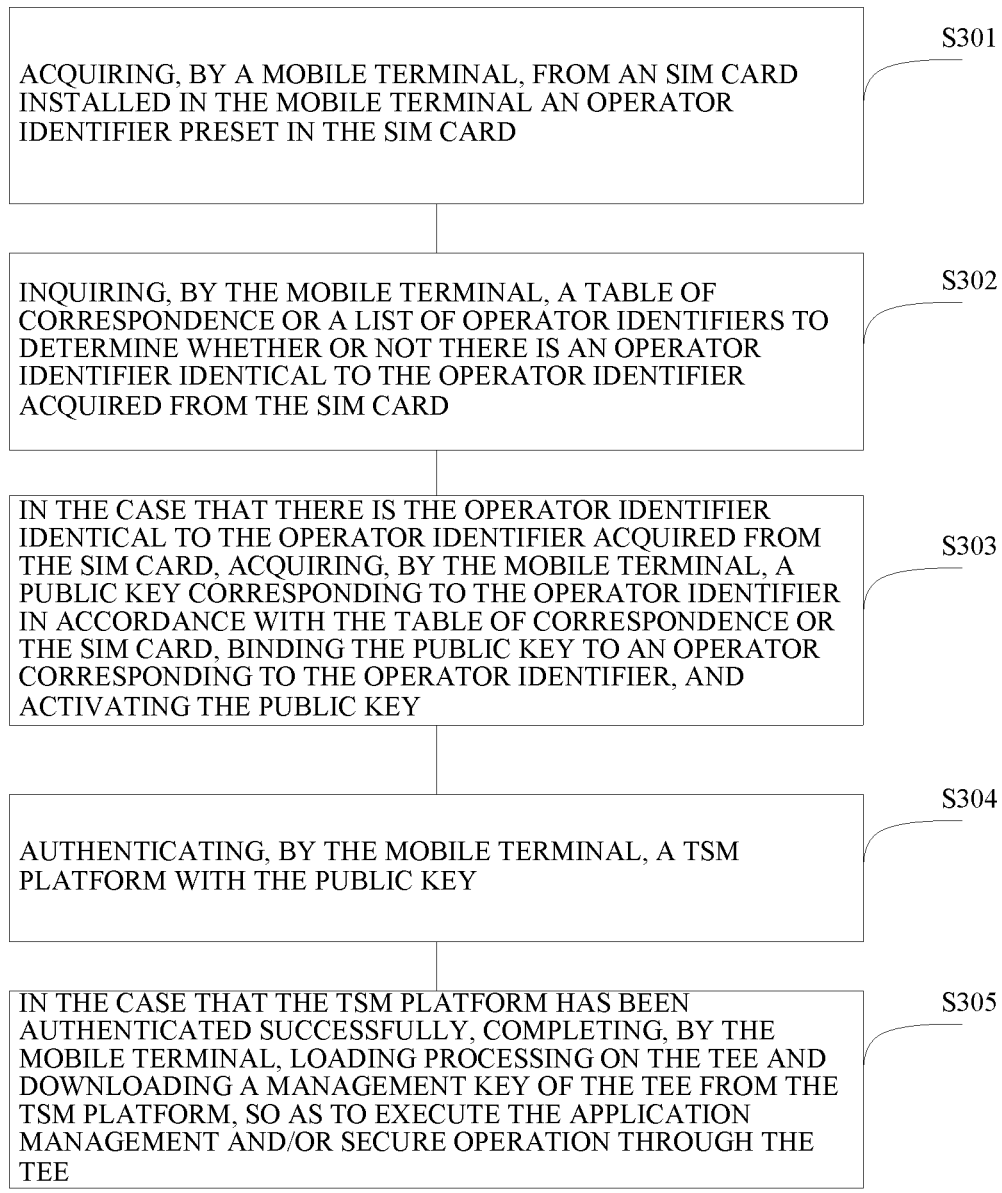
FIG. 3 is a flow chart of a TEE initialization method according to one embodiment of the present disclosure.

As shown in FIG. 3, the method includes the following steps.

Step S301: acquiring, by the mobile terminal, from an SIM card installed in the mobile terminal an operator identifier preset in the SIM card. Prior to Step S301, the mobile terminal starts an initialization process and loads the TEE.

Step S302: inquiring, by the mobile terminal, the table of correspondence or the list to determine whether or not there is an operator identifier identical to the operator identifier acquired from the SIM card.

Step 303: in the case that there is the operator identifier identical to the operator identifier acquired from the SIM card, acquiring, by the mobile terminal, a public key corresponding to the operator identifier in accordance with the table of correspondence or the SIM card, binding the public key to an operator corresponding to the operator identifier, and activating the public key.

Based on various settings of the TEE and a condition where the public key may be carried in the SIM card, in this step, the public key may be acquired in the following two ways. In the case that merely the list of operator identifiers is preset in the TEE, the corresponding public key may be acquired from the SIM card, and in the case that the table of correspondence between the operator identifiers and the public keys is preset in the TEE, the corresponding public key may be acquired from the table of correspondence.

Step S304: authenticating, by the mobile terminal, the TSM platform with the public key. To be specific, in this step, the mobile terminal may send an authentication request to the TSM platform, verify network-side signature information returned by the TSM platform in accordance with the public key, and determine whether or not the TSM platform is authenticated successfully in accordance with a verification result.

In addition, it should be appreciated that, a private key may also be preset in the TEE. The mobile terminal may determine terminal-side signature information in accordance with the private key, and send the authentication request carrying the terminal-side signature information to the TSM platform. After the TEE has been authenticated successfully in accordance with the terminal-side signature information, the TSM platform may generate the network-side signature information and return it to the mobile terminal. Through the mutual authentication between the TSM platform and the mobile terminal, it is able to improve the security of the authentication.

Step S305: in the case that the TSM platform has been authenticated successfully, completing, by the mobile terminal, loading processing on the TEE and downloading a management key of the TEE from the TSM platform, so as to execute the application management and/or secure operation through the TEE.

After Step S305, in the case that the SIM card installed in the mobile terminal has been changed, the mobile terminal may determine whether or not the operator identifiers corresponding to the original SIM card and a new SIM card are different from each other, and if yes, determine that an operator identifier needs to be acquired from the new SIM card, i.e., Steps S301 to S305 may be repeated.

Figure 4:
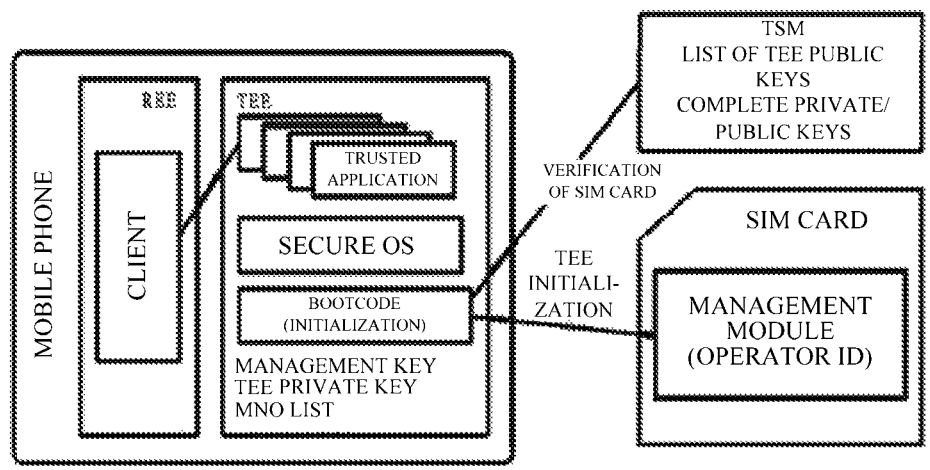
FIG. 4 is a schematic view showing system architecture for running the TEE according to one embodiment of the present disclosure.

The present disclosure will be described hereinafter in conjunction with the system architecture as shown in FIG. 4. In this system architecture, the list of operator identifiers and information about the corresponding public keys are stored in the TEE, and the operator identifier (ID) is stored in the SIM card. To be specific, the information stored in the TEE includes: (1) TEE private key for authenticating the TEE by an external entity such as the TSM platform; (2) the list of the operator identifiers for selecting the operators during the starting of the TEE in accordance with information stored in the SIM card, and the corresponding public key for authenticating the external entity (e.g., the TSM platform); and (3) other private keys, e.g., those for managing applications.

In addition, devices in the system need to support various functions. To be specific, the mobile terminal is configured to generate a pair of the public key and the private key and a bootcode during the initialization, and it is capable of accessing the SIM card so as to select the operator, activate the public key and initialize a management key. The SIM card is configured to add a corresponding management application, so as to manage the operator identifiers. The TSM platform is configured to initialize the management key.

Based on the above system architecture, the TEE initialization method includes the following five procedures.

(1) Issuance of Terminal

Figure 5:
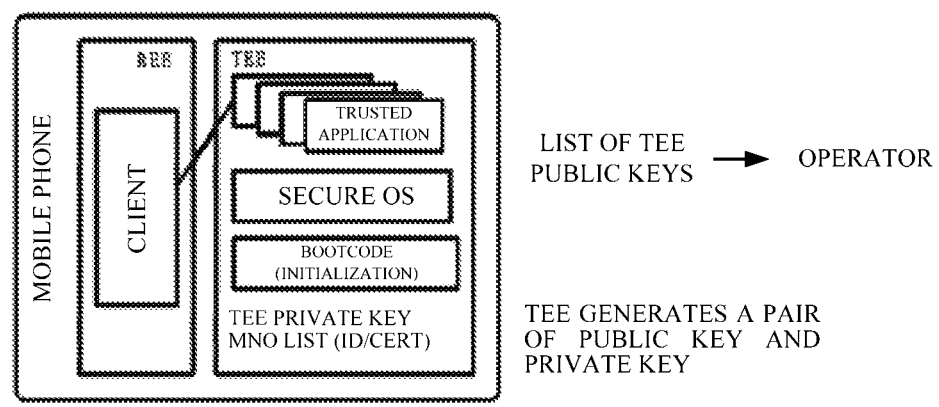
FIG. 5 is a schematic view showing the operation of the TEE during the issuance of the terminal according to one embodiment of the present disclosure.

FIG. 5 shows the operation on the TEE during the issuance of the mobile terminal. It should be appreciated that, the list of the operator identifiers needs to be preset in the TEE, and this list includes identifiers of the available operators and public keys corresponding to these operators. In addition, the private keys (standby keys for the public keys) may also be preset by a manufacturer in the TEE, and the public keys may be provided to the operator in accordance with order information.

(2) Issuance of SIM Card

Figure 6:
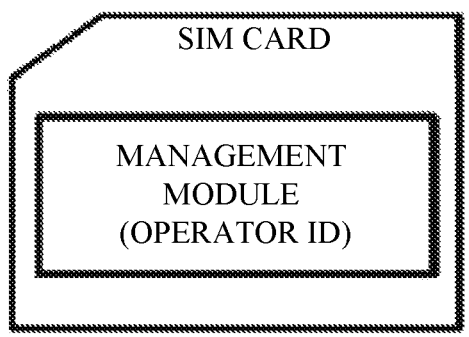
FIG. 6 is a schematic view showing a SIM card according to one embodiment of the present disclosure.

As shown in FIG. 6, a management module is preset during the issuance of the SIM card, and the SIM card is configured with the operator identifier.

(3) Activation of Public Key for Operator

Figure 7:
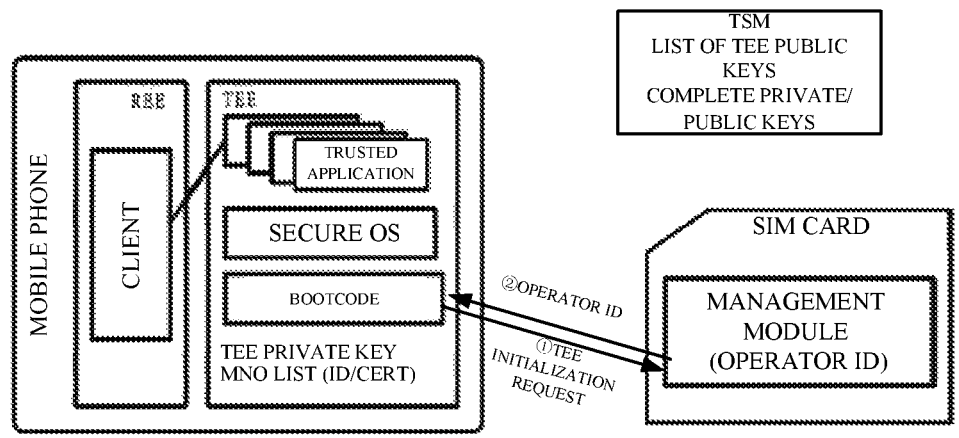
FIG. 7 is a schematic view showing an activation procedure of a public key according to one embodiment of the present disclosure.

During the starting of the TEE, it needs to activate the public key for the operator, so as to enable the subsequent interaction. Hence, during the loading of the TEE, the bootcode or a secure Operating System (OS) needs to read the operator identifier from the management module of the SIM card. After the operator identifier matches an operator identifier in the list, the TEE is bound to the corresponding operator, and the corresponding public key is activated, as shown in FIG. 7.

After the activation of the public key, it may be used to authenticate the TSM platform and complete the subsequent initialization procedure, e.g., downloading the management key.

(4) Secure Application Interaction

Figure 8:
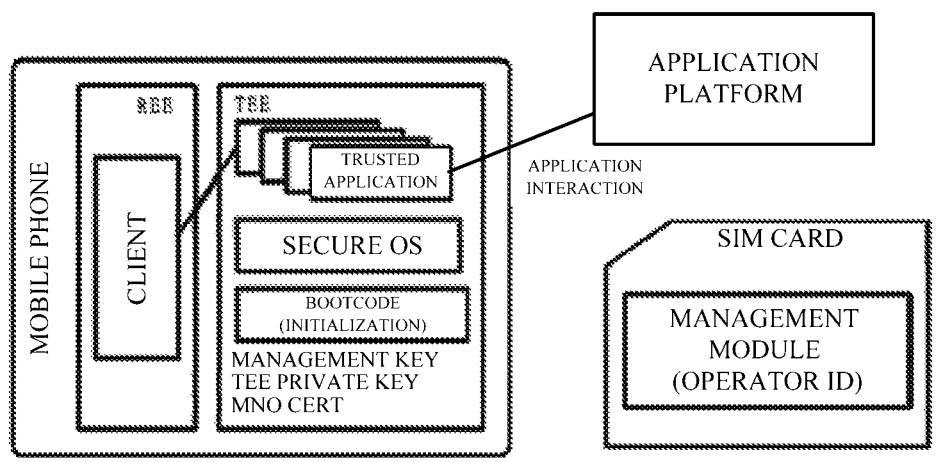
FIG. 8 is a schematic view showing the secure application interaction according to one embodiment of the present disclosure.

As shown in FIG. 8, after the downloading of the applications and the initialization, a REE client may initiate a request for trusted applications in the TEE, so as to complete the interaction between the trusted applications and an application platform.

(5) Change of Operator

Figure 9:
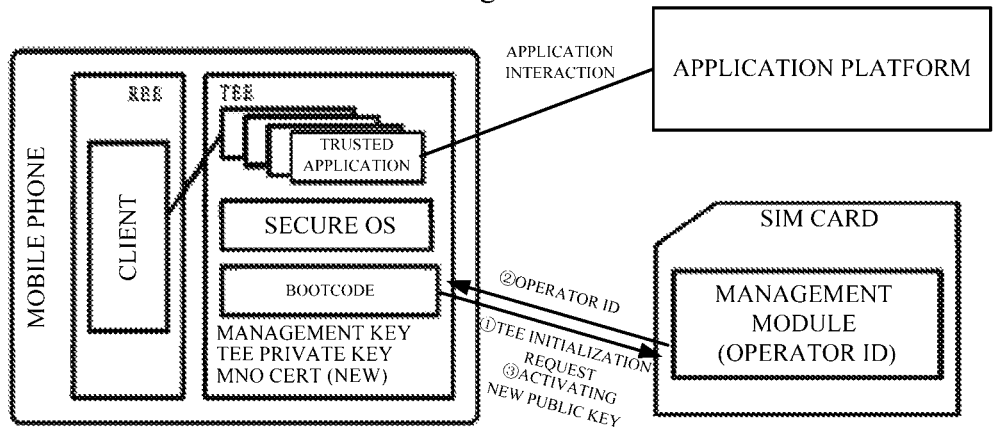
FIG. 9 is a schematic view showing the change of operators according to one embodiment of the present disclosure.

In the case that the user selects to change the operator, the corresponding public key needs to be activated, and at this time, the original public key is invalid, as shown in FIG. 9. To be specific, after the operator has been changed and the SIM card has been replaced, a new public key for a new operator needs to be activated for the TEE (i.e., the original public key is invalid), and then the subsequent management procedures (e.g., downloading the management key) are completed.

Figure 10:
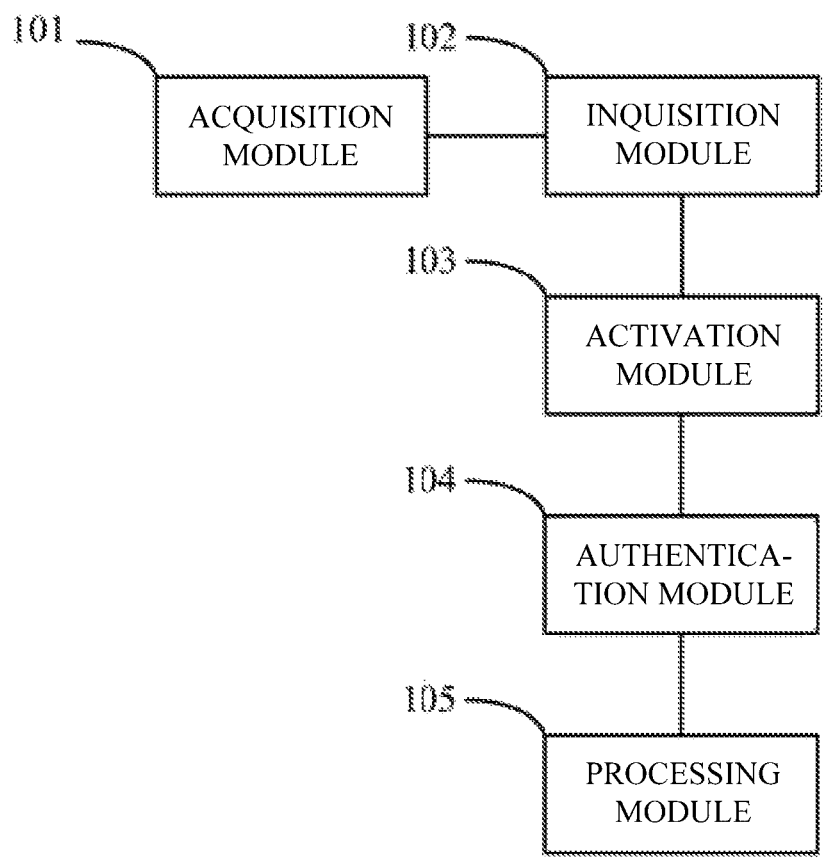
FIG. 10 is a block diagram of a mobile terminal according to one embodiment of the present disclosure.

As shown in FIG. 10, the present disclosure further provides a mobile terminal for a system including the mobile terminal and a TSM platform, and the mobile terminal is provided with a TEE in which a list of operator identifiers or a table of correspondence between the operator identifiers and corresponding public keys is preset. The mobile terminal includes: an acquisition module 101 configured to acquire from an SIM card installed in the mobile terminal an operator identifier preset in the SIM card; an inquisition module 102 configured to inquire the table of correspondence or the list to determine whether or not there is an operator identifier identical to the operator identifier acquired from the SIM card; an activation module 103 configured to, in the case that there is the operator identifier identical to the operator identifier acquired from the SIM card, acquire a public key corresponding to the operator identifier in accordance with the table of correspondence or the SIM card, bind the public key to an operator corresponding to the operator identifier, and activate the public key; an authentication module 104 configured to authenticate the TSM platform with the public key; and a processing module 105 configured to, in the case that the TSM platform has been authenticated successfully, complete the loading processing on the TEE and download a management key of the TEE from the TSM platform, so as to execute the application management and/or secure operation through the TEE.

Alternatively, the authentication module is further configured to send an authentication request to the TSM platform, verify network-side signature information returned by the TSM platform in accordance with the public key, and determine whether or not the TSM platform has been authenticated successfully in accordance with a verification result.

Alternatively, a private key is also preset in the TEE, and the authentication module is further configured to determine terminal-side signature information in accordance with the private key, and send the authentication request carrying the terminal-side signature information to the TSM platform, so that the TSM generates the network-side signature information after the TEE has been authenticated successfully in accordance with the terminal-side signature information, and return the network-side signature information to the mobile terminal.

Alternatively, the processing module is further configured to start the initialization and load the TEE before the acquisition module acquires the operator identifier from the SIM card installed in the mobile terminal.

Alternatively, the mobile terminal further includes a detection module configured to, in the case that the SIM card installed in the mobile terminal has been changed, determine whether or not the operator identifiers corresponding to the original SIM card and a new SIM card are different from each other, and if yes, determine that it needs to acquire the operator identifier from the new SIM card.

According to the embodiments of the present disclosure, the operator identifier acquired from the SIM card is compared with the operator identifiers in the list of the operator identifiers or the table of correspondence between the operator identifiers and the public keys preset in the TEE of the mobile terminal, so as to acquire the public key and authenticate the TSM platform with the public key. After the TSM platform has been authenticated successfully, the loading of the TEE is completed successfully, and the management key of the TEE is downloaded from the TSM platform. As a result, it is able to initialize the TEE of the mobile terminal without designating the operator, thereby to improve the openness of the mobile terminal as well as the user experience.

Through the above-mentioned description, it may be apparent for a person skilled in the art that the present disclosure may be implemented by hardware, or by software as well as a necessary common hardware platform. Based on this understanding, the technical solutions of the present disclosure may appear in the form of software products, which may be stored in a non-volatile storage medium (e.g. Compact Disc Read-Only Memory (CD-ROM), Universal Serial Bus (USB), flash disk or mobile Hard Disk Drive (HDD)) and include several instructions so as to enable a computer equipment (e.g. personal computer, server or network equipment) to execute the methods according to the embodiments of the present disclosure.

It should be appreciated that, the drawings merely relate a preferred application scenario, and all the modules or procedures mentioned in the drawings are not always those necessary for the implementation of the present disclosure.

It should be further appreciated that, the modules in the device may be arranged in the device as described in the embodiments or, after some changes, in one or more devices different from that according to the embodiments of the present disclosure. The modules may be combined into one module, or may be further divided into a plurality of submodules.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Trusted Execution Environment (TEE) initialization method, for a system comprising a Trusted Service Management (TSM) platform and a mobile terminal provided with a TEE in which a list of operator identifiers or a table of correspondence between the operator identifiers and public keys is preset, comprising steps of:

acquiring, by the mobile terminal, from a Subscriber Identity Module (SIM) card installed in the mobile terminal an operator identifier preset in the SIM card;

inquiring, by the mobile terminal, the table of correspondence or the list to determine whether or not there is an operator identifier identical to the operator identifier acquired from the SIM card;

in the case that there is the operator identifier identical to the operator identifier acquired from the SIM card, acquiring, by the mobile terminal, a public key corresponding to the operator identifier in accordance with the table of correspondence or the SIM card, binding the public key to an operator corresponding to the operator identifier, and activating the public key;

authenticating, by the mobile terminal, the TSM platform with the public key; and in the case that the TSM platform has been authenticated successfully, completing, by the mobile terminal, loading processing on the TEE and downloading a management key of the TEE from the TSM platform, so as to execute the application management and/or secure operation through the TEE.

2. The TEE initialization method according to claim 1, wherein the step of authenticating, by the mobile terminal, the TSM platform with the public key comprises:

sending, by the mobile terminal, an authentication request to the TSM platform; and verifying, by the mobile terminal, network-side signature information returned by the TSM platform in accordance with the public key, and determining whether or not the TSM has been authenticated successfully in accordance with a verification result.

3. The TEE initialization method according to claim 2, wherein a private key is further present in the TEE, and the step of sending, by the mobile terminal, the authentication request to the TSM platform comprises:

determining, by the mobile terminal, terminal-side signature information in accordance with the private key, and sending the authentication request carrying the terminal-side signature information to the TSM platform, so as to enable the TSM platform to generate the network-side signature information after the TEE has been authenticated successfully in accordance with the terminal-side signature information and to return the network-side signature information to the mobile terminal.

4. The TEE initialization method according to claim 1, wherein prior to the step of acquiring, by the mobile terminal, from the SIM card installed in the mobile terminal the operator identifier, the TEE initialization method further comprises:

starting, by the mobile terminal, an initialization process and loading the TEE.

5. The TEE initialization method according to claim 1, wherein subsequent to the step of completing, by the mobile terminal, the loading processing on the TEE, the TEE initialization method further comprises:

in the case that the SIM card installed in the mobile terminal has been changed, determining, by the mobile terminal, whether or not the operator identifiers corresponding to the original SIM card and a new SIM card are different from each other, and if yes, determining that it needs to acquire from the new SIM card a new operator identifier.

6. A mobile terminal for a system comprising the mobile terminal and a Trusted Service Management (TSM) platform, the mobile terminal being provided with a Trusted Execution Environment (TEE) in which a list of operator identifiers or a table of correspondence between the operator identifiers and public keys is preset, the mobile terminal comprising:

an acquisition module configured to acquire from a Subscriber Identity Module (SIM) card installed in the mobile terminal an operator identifier preset in the SIM card;

an inquisition module configured to inquire the table of correspondence or the list to determine whether or not there is an operator identifier identical to the operator identifier acquired from the SIM card;

an activation module configured to, in the case that there is the operator identifier identical to the operator identifier acquired from the SIM card, acquire a public key corresponding to the operator identifier in accordance with the table of correspondence or the SIM card, bind the public key to an operator corresponding to the operator identifier, and activate the public key;

an authentication module configured to authenticate the TSM platform with the public key; and a processing module configured to, in the case that the TSM platform has been authenticated successfully, complete loading processing on the TEE and download a management key of the TEE from the TSM platform, so as to execute the application management and/or secure operation through the TEE.

7. The mobile terminal according to claim 6, wherein the authentication module is further configured to send an authentication request to the TSM platform, verify network-side signature information returned by the TSM platform in accordance with the public key, and determine whether or not the TSM has been authenticated successfully in accordance with a verification result.

8. The mobile terminal according to claim 7, wherein a private key is further present in the TEE, and the authentication module is further configured to determine terminal-side signature information in accordance with the private key, and send the authentication request carrying the terminal-side signature information to the TSM platform, so that the TSM platform generates the network-side signature information after the TEE has been authenticated successfully in accordance with the terminal-side signature information and returns the network-side signature information to the mobile terminal.

9. The mobile terminal according to claim 6, wherein the processing module is further configured to, before the acquisition module acquires the operator identifier from the SIM card installed in the mobile terminal, start an initialization process and load the TEE.

10. The mobile terminal according to claim 6, further comprising:

a detection module configured to, in the case that the SIM card installed in the mobile terminal has been changed, determine whether or not the operator identifiers corresponding to the original SIM card and a new SIM card are different from each other, and if yes, determine that it needs to acquire from the new SIM card a new operator identifier.

* * * * *